July 25, 1961 A. VAUGOYEAU 2,993,707
SUSPENSION UNIT FOR VEHICLES
Filed Nov. 13, 1958 4 Sheets-Sheet 1

INVENTOR
ALEXANDRE VAUGOYEAU

July 25, 1961 A. VAUGOYEAU 2,993,707
SUSPENSION UNIT FOR VEHICLES
Filed Nov. 13, 1958 4 Sheets-Sheet 2
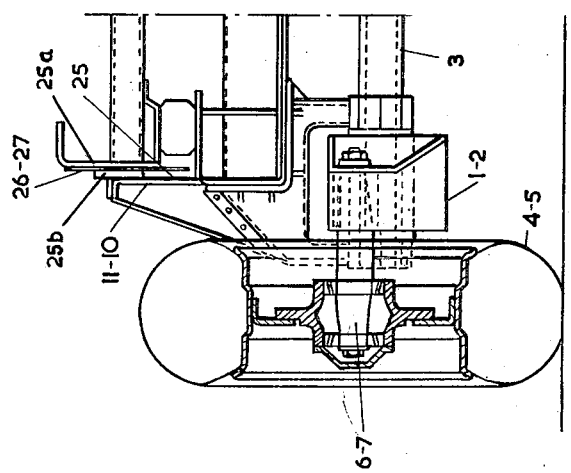
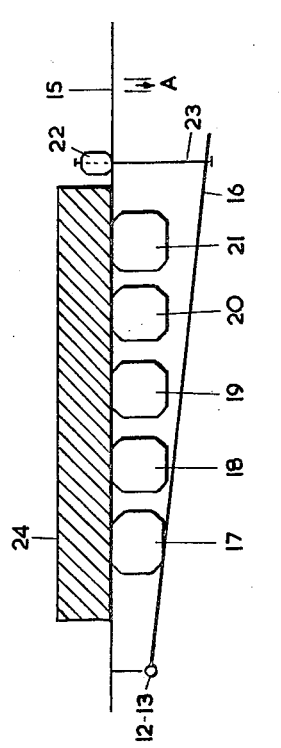
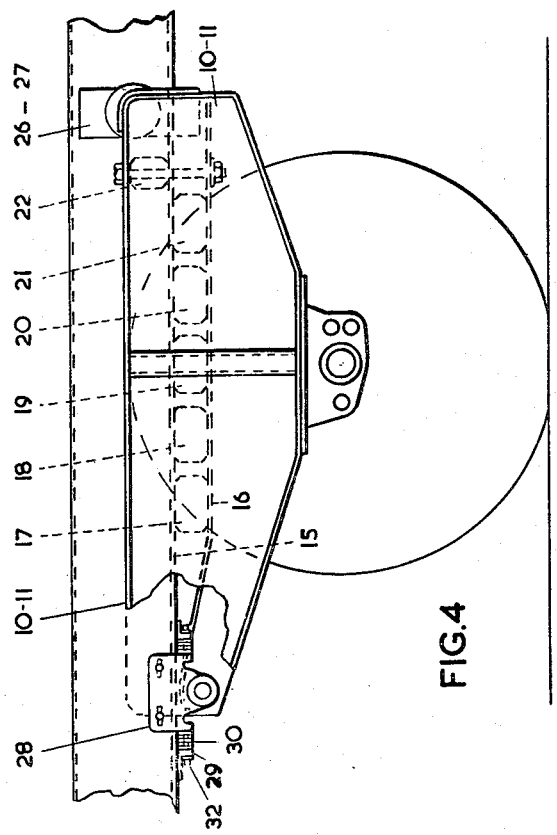
INVENTOR
ALEXANDRE VAUGOYEAU July 25, 1961 A. VAUGOYEAU 2,993,707
SUSPENSION UNIT FOR VEHICLES
Filed Nov. 13, 1958 4 Sheets-Sheet 3
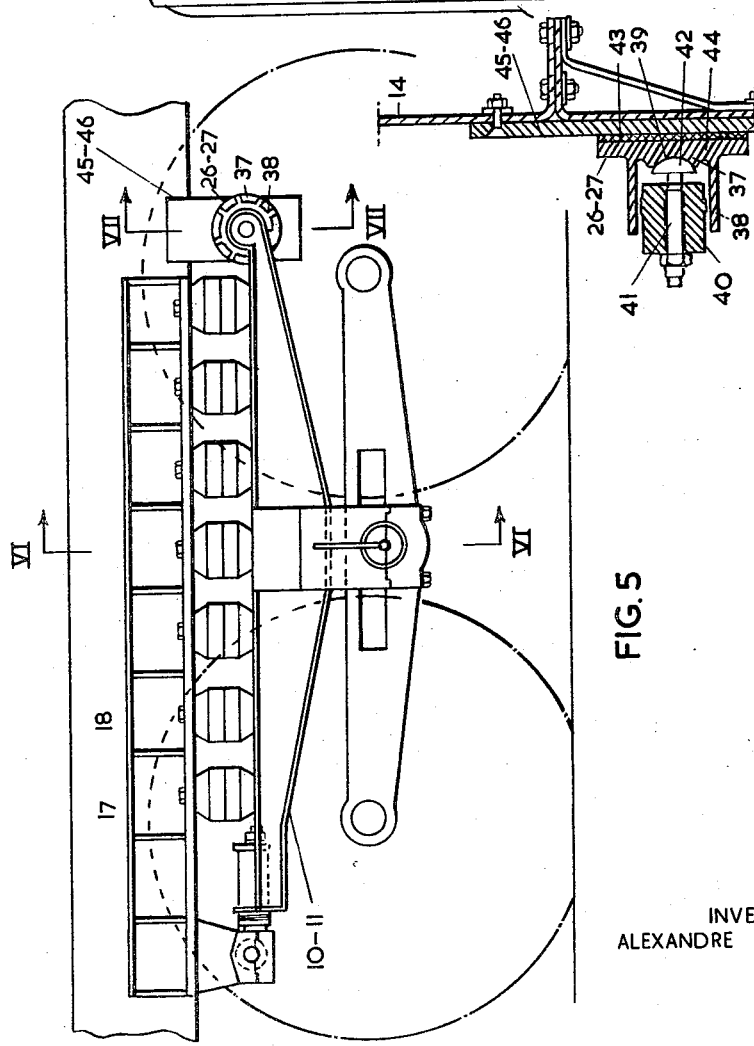
INVENTOR
ALEXANDRE VAUGOYEAU

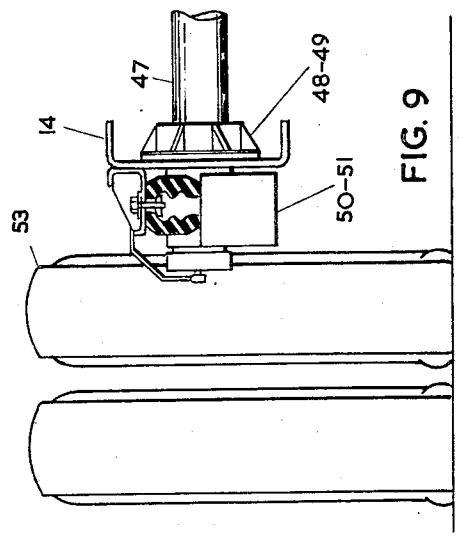
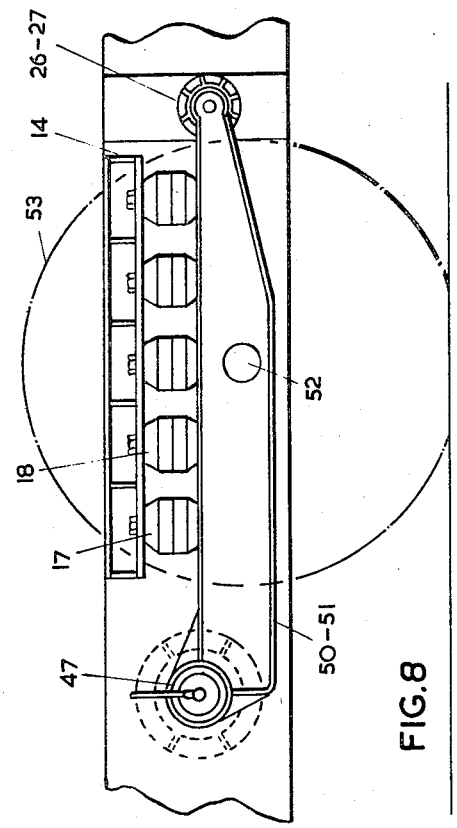

United States Patent Office 2,993,707
Patented July 25, 1961

2,993,707
SUSPENSION UNIT FOR VEHICLES
Alexandre Vaugoyeau, Saint Marcel, Marseille, France
Filed Nov. 13, 1958, Ser. No. 773,754
Claims priority, application France Nov. 27, 1957
4 Claims. (Cl. 280—124)

The suspension of vehicles is one of the principal elements permitting its use under the optimum possible conditions, both loaded and empty.

In the case of industrial vehicles, the great difference existing between their unladen weight and laden weight renders this problem very difficult to resolve with the conventional devices. In fact with one single spring or even two, a suspension is always obtained which is either too hard when unladen, or too soft when laden, since their action upon the axle is direct.

The object of the invention consists in a device removing the above disadvantages, permitting of obtaining a suspension unit of variable flexity of the isochronous type, by the use of springs of identical or different characteristics coming into action one after the other, as the weight to be supported increases, by means of a lever.

It is characterised by the means utilised, taken both as a whole and separately, and more particularly by the arrangement in the suspension system of springs of appropriate type gripped between the two legs of a pair of compasses, the displacement of which permits their entry into action one after the other, it being specified that this suspension unit utilises springs, the distance of which in relation to the point of articulation, the spacing and the length, can vary so as to obtain a selected flexibility curve.

Friction dampers and lateral springs increase the transverse stability of the vehicle, completing this assembly.

In the accompanying drawings,

FIGURE 2 represents the suspension, seen in cross-section.

FIGURE 3 is a diagram to show the manner of operation of the invention.

FIGURE 4 is a view, in elevation and longitudinal section, of a modification for axled vehicles.

FIGURE 5 is a side elevation of a further modification.

FIGURE 6 is a partial section taken on the line a—b of FIG. 5.

FIGURE 7 is an enlarged partial section taken on the line c—d of FIG. 5.

FIGURE 8 is a side elevation of a still further modification for an underslung chassis.

FIGURE 9 is a partial and elevation corresponding to FIG. 8.

Figure 1:
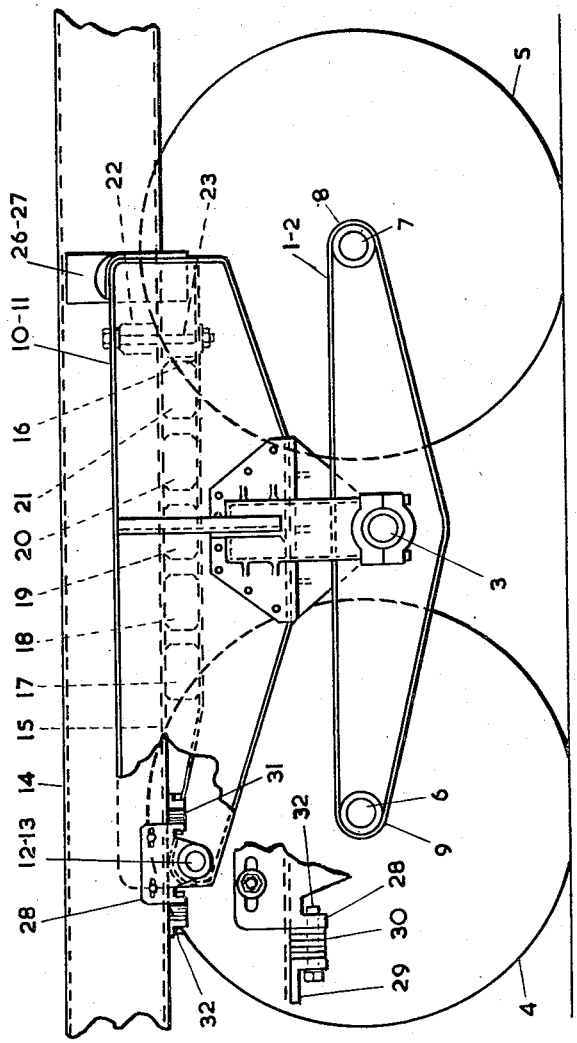
FIGURE 1 shows the device, seen in longitudinal section.

This suspension (FIGURES 1 and 2) comprises two arms 1, 2 articulated on the shaft 3 so as to distribute the load equally to the two wheels 4, 5. These wheels are mounted on spindles 6, 7 fixed on the ends 8, 9 of the arms 1, 2.

The shaft 3 is supported by bearer arms 10, 11 attached to articulations 12, 13 on the chassis 14 of the vehicle.

The bearer arms 10, 11 are disposed in such fashion as to form with the chassis 14 a sort of pair of compasses, the legs 15 and 16 of which (FIGURE 3) are movable and can approach and depart from one another, the leg 15 (FIG. 1) being part of the chassis 14 and forming a bearer elements.

Between the bearer element 15 and leg 16 there are interposed rubber compression springs 17, 18, 19, 20, 21 carried by the chassis 14, and the number, position and spacing of which can be adapted to each use.

A supplementary spring 22 (FIGURES 1, 3 and 4) bearing on the chassis 14 is compressed by the rod 23, when the bearer element 15 and leg 16 of the pair of compasses depart from one another (arrow A).

The bearer arms 10 and 11 are provided with flanges 25 which fit round the chassis 14 in such fashion that the assembly of the suspension is constantly held in the same longitudinal axis of the chassis.

Adjustable friction plates 26, 27 are interposed between the guide surfaces 25a on chassis 14 and shoes 25b on the flanges 25 to prevent lateral movement of the bearer arms with respect to the chassis, and can be replaced in case of wear.

The pivots 12 and 13 are rubber bushed and connected to the chassis 14 by adjustable pillow-blocks 28, the position of which, along the chassis 14, can be varied so that it is possible, during assembly, or after wear, to adjust the perpendicularity of the axle in relation to the chassis.

This adjustment can be effected by interposing between the block 28 and the fixed stops 29, a suitable number of spacing washers 30, 31 held by bolts 32.

The example described is provided for a suspension with two independent pairs of in-line wheels without common axle, but it is equally applicable to suspensions with a common axle, as represented in FIGURE 4.

Referring to the diagram of FIG. 3, if the load 24 bearing on the chassis 14 and consequently on the leg 16 diminishes, the bearer element 15 and leg 16 will open under the thrust of the springs 17, 18, 19, 20, 21. As the bearer element and leg part, the spring 21, having reached its maximum expansion, ceases to bear upon the leg 16. With further diminution of load, the other springs 20, 19, 18, 17 also successively cease to act on the leg 16.

When the weight of the load increases, the converse occurs, the springs 17, 18, 19, 20, 21 coming into action successively.

The position of the bearer elements 15 and leg 16, is such in relation to their point of articulation 12, 13, that when the load is at the maximum, the leg 16 becomes parallel to the bearer element 15 and all the springs are compressed by the same amount.

The spring 22 acts to restrict the opening of the bearer element 15 and leg 16, when for example the vehicle passes over a large irregularity of surface.

In the modification shown in FIGS. 5 and 6, springs 33, 34 are made so that they can be fixed by their upper face 35 on the chassis 14 and by their lower face 36 on the connecting bearer arms 10, 11. These springs work both in compression to reinforce the action of the main springs 17, 18, and in extension to limit the opening movement of the arms 10, 11 with respect to the chassis, i.e. in substitution for the spring 22 of FIG. 3. They also oppose transverse torque and centrifugal force. The friction elements (FIGURES 5, 6, 7) 26, 27 are constituted by a body 37 provided with a fluted circular socket 38, the bottom 39 of which is shaped to provide a spherical seating. On the free end of the arms 10, 11, are provided bushes 40 through which passes a bolt 41, the part spherical head 42 of which, engages in the seating of socket 38. Between the base 44 of the socket 38 and the friction plate 45—46 on the chassis is provided a lining of friction material 43, similar to brake-lining. For underslung chassis (FIGURES 8, 9) a transverse axle 47 mounted in bearings 48, 49 serves as a pivot for two arms 50, 51 at the rear end of which are fixed friction elements 26, 27 serving as dampers. The arms 50, 51 support, centrally, a spindle 52 about which there rotates the wheel 53.

The springs 17, 18 are interposed between the arms 50, 51 and the chassis 14.

By varying the number of the springs, their compression-resistance, their spacing and their distance from the articulations 12 and 13 of the compass legs, it is possible to obtain exactly the flexibility sought for a good suspension of the vehicle.

The suspension can be much more flexible when unladen than when laden, that is to say with flexibility decreasing as a function of the load.

Thence an enormous advance over present-day suspensions is thus realised, as these do not respond to this essential condition.

I claim:

1. A suspension assembly for wheeled vehicles having a chassis comprising a bearer element on the chassis of the vehicle and aligned longitudinally of the vehicle, a bearer arm for road wheels positioned beneath the bearer element and mounted thereon by a pivot permitting relative to and fro movement of the bearer element and bearer arm, and a plurality of resilient compressible members of equal unconstrained height arranged in a row between the bearer element and the bearer arm, said bearer arm being inclined with respect to said bearer element and being out of engagement with the resiliently compressible members when in unloaded condition, the shape and relative positioning of a linear surface of the bearer element and a linear surface of the bearer arm adapted to abut against the compression members being such that, with and in proportion to increasing load and as the bearer element and bearer arm move relatively towards each other, the row of compression members are engaged by said bearer arm and brought serially into and retained in a state of compression.

2. A suspension assembly, as claimed in claim 1, including a damper spring means coupled between relatively separable parts of the bearer element and bearer arm and arranged to apply an increasing counterforce as separation thereof is increased.

3. A suspension assembly, as claimed in claim 1, including shoes on the bearer arm coacting with guide surfaces on the bearer element to prevent lateral movement of the bearer arm with respect to the chassis.

4. A suspension assembly, as claimed in claim 1, wherein the pivot is relatively adjustable along the bearer element to permit adjustment of the axis of rotation of the wheels transversely of the chassis.

References Cited in the file of this patent

UNITED STATES PATENTS

| | | |
|---|---|---|
| 1,325,832 | Coburn | Dec. 23, 1919 |
| 1,410,645 | Biedinger | Mar. 28, 1922 |
| 1,912,308 | Rayburn | May 30, 1933 |
| 2,181,546 | Bradshaw | Nov. 28, 1939 |
| 2,352,446 | Pointer | June 27, 1944 |
| 2,526,866 | Hersey | Oct. 24, 1950 |
| 2,695,779 | Brandt | Nov. 30, 1954 |
| 2,729,441 | Henss | Jan. 3, 1956 |

FOREIGN PATENTS

| | | |
|---|---|---|
| 60,205 | France | Apr. 7, 1954 |
| | (2nd addition to No. 977,343) | |
| 651,954 | France | Oct. 16, 1928 |
| 899,145 | Germany | Dec. 7, 1953 |